Patented Jan. 28, 1936

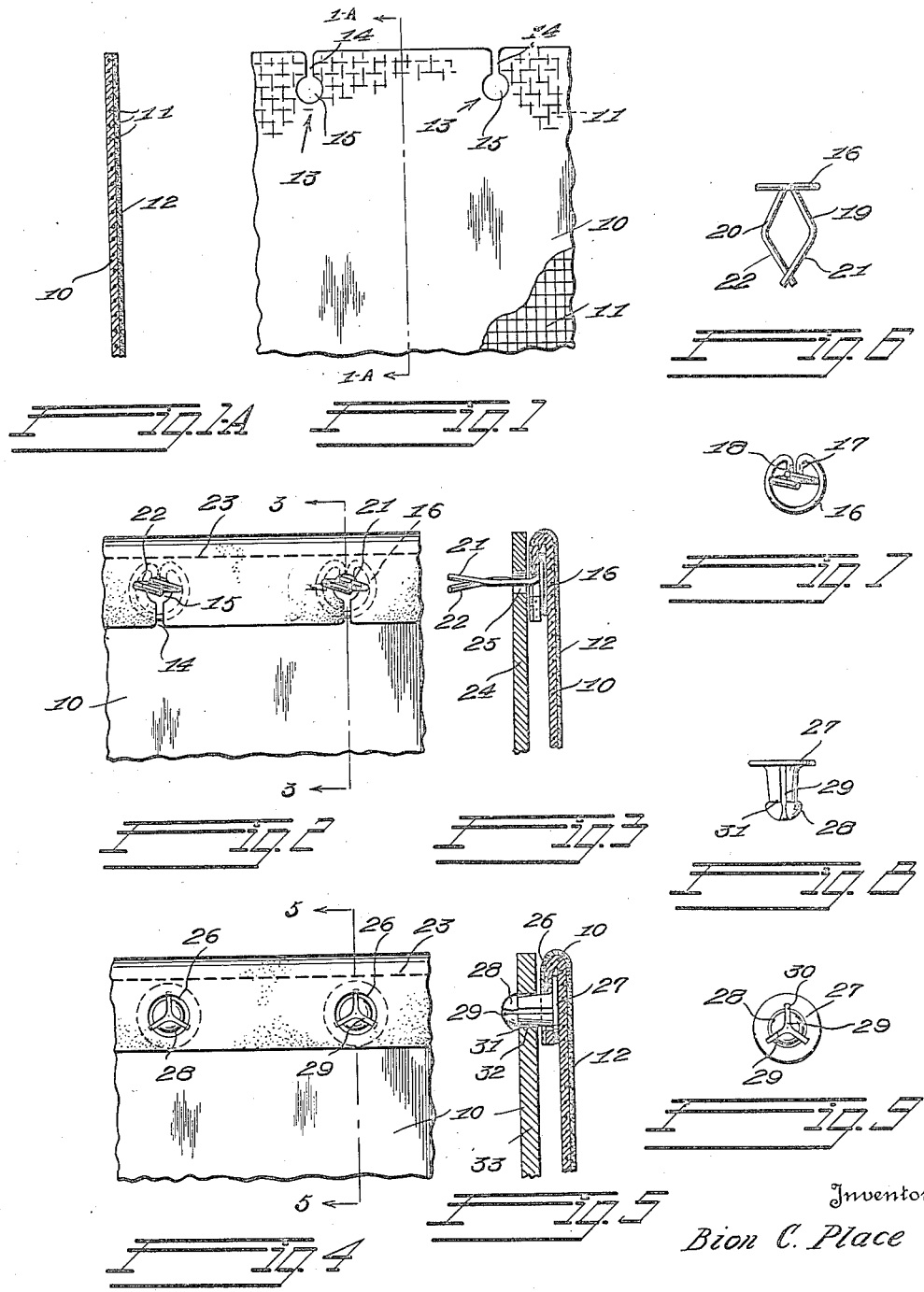

2,028,992

UNITED STATES PATENT OFFICE 2,028,992

SECURING TRIM PANELS

Bion C. Place, Detroit, Mich., assignor of one-half to George E. Gagnier, Detroit, Mich.

Application July 17, 1929, Serial No. 378,964

1 Claim. (Cl. 45—138)

This invention relates to a method and arrangement for securing trim panels to a suitable supporting structure, having characteristics in common with the method and arrangement disclosed in my Patent No. 1,722,944 dated July 30, 1929. More particularly, the invention relates to the securing of trim panels to the interior of metal automobile or aircraft bodies. Such panels are now commonly secured to the interior of said bodies by spring fasteners that enter suitably formed perforations in the portion of the metal body and grip or abut against the walls of the perforation or the inner surface of the supporting structure adjacent the perforation. Such fasteners are used because, generally, the rear of the supporting structure is inaccessible for the application of nuts or similar fastening elements.

The invention is particularly designed for use in connection with the finishing of metal automobile bodies, but it should be understood that it is equally applicable to automobile bodies constructed in whole, or in part, of wood, it being only necessary in adapting the invention to the latter construction to supply the wooden portions of the body with suitable metal socket members provided with perforations corresponding to the perforations ordinarily provided in a metal body.

The invention aims to provide a method of and arrangement for securing trim panels to automobile or similar bodies, by forming the panel so as to strengthen it and so that at the same time the spring fastener of whatever form may be used may be applied to the panel after the covering material ordinarily applied to the foundation or body of the panel has been applied to said foundation. The latter is ordinarily constructed of relatively stiff material, or metal reinforced fibre board, while the covering material usually is a fabric of suitable kind.

It is extremely desirable in applying panels to the interior of bodies to be able to assemble and construct the panel completely before it is necessary to apply the fasteners thereto, in order to avoid the necessity of applying the cover material to the body of a panel that has fasteners assembled with respect to it because the fasteners projecting from such foundation or body of the panel seriously interfere with the expeditious covering of the body or foundation with the covering material, and likewise, prevent the ready stacking and handling of the panels during and after the process of covering them prior to their being put into use.

This invention further aims to provide a method and arrangement for securing trim panels to the interior of bodies, such as automobile or aircraft bodies, in which the fastener may be assembled from the rear of the trim panel after the assembly of the panel itself has been completed in which the edge of the trim panel is bent upon itself to strengthen the edge of the panel and give it the appearance of having a substantial thickness. The fasteners are anchored with respect to the turned back portion of the completed panel after its completion, so that one complete thickness of the finished panel is disposed between the head of the fastener and the exterior surface of the panel.

This invention aims also to provide a trim panel having its edges turned back upon the body thereof so as to strengthen the edges, in which the edges are utilized to serve as a means for anchoring the fastener with respect to the panel with the shanks or holding portions of the fastener projecting away from the panel so that the panel may be subsequently applied to its supporting structure in an extremely simple and expeditious manner.

A still further object of the invention is to provide a method of securing panels including a novel arrangement for interlocking the fasteners with respect to a turned back edge portion of the panel itself.

A still further object of the invention is to provide a panel for finishing purposes, including a body or foundation constructed of material that will withstand very severe usage and bending to sharp angles without breaking or rupturing, to the end that the edges thereof may be turned back upon the body of the panel to strengthen them and at the same time serve as a means for anchoring the fasteners with respect to the panel.

A still further object of the invention is to provide a trim panel including a body or foundation constructed of fibrous material, provided with a metal reinforcement, which reinforcement serves to prevent tearing of the edges of said foundation or body and the edges of any openings formed in the said edges to receive fasteners.

Further objects of the invention will appear as a description thereof proceeds with reference to the accompanying drawing in which:

Fig. 1 is a plan view of a fragment of a foundation or body of a trim panel, the corner of one of the layers of fibrous material being broken away to expose the metal reinforcement.

Fig. 1a is a sectional view taken on the line IA—IA of Fig. 1.

Fig. 2 is a view taken from the inside of the trim panel having an edge bent back upon the body and fixed thereto, and provided with one form of spring fastener interlocked with said turned back edges.

Fig. 3 is a sectional view taken on the line 3—3 of Fig. 2 and showing the panel applied to a foundation structure, omitted from Fig. 2 to clearly show the arrangement of the fasteners with respect to the panels.

Fig. 4 is a view taken from the rear of a modified form of trim panel showing a different type of fastener anchored with respect to the turned back edge of said trim panel.

Fig. 5 is a sectional view taken on the line 5—5 of Fig. 4, showing the panel applied to a suitable perforated foundation structure.

Figs. 6 and 7 are respectively, a side view and a view looking along the shank of the fastener toward the head thereof of a preferred form of spring fastener, that may be used to secure the panels to a supporting structure.

Figs. 8 and 9 are respectively, an elevational view of another type of fastener, and a view looking along the shank of said fastener toward the head thereof.

Like reference characters indicate like parts throughout the several figures.

In the drawing, the numeral 10 designates the foundation or body of a trim panel, such as the trim panel of an automobile body for example. Said foundation 10 is preferably constructed of fibrous material provided with a metallic reinforcement 11, in the form of a reticulated wire fabric of relatively small mesh. The foundation or body of the panel is constructed by applying layers of paper to opposite sides of the reticulated wire reinforcement 11 by applying said layers to opposite sides thereof and subjecting the structure to a sufficient pressure to cause the paper layers to interlock with the wire reinforcement through the interstices in the metal fabric. Preferably, the foundation or body just briefly described is formed in accordance with the disclosure in Patent No. 1,770,521 dated July 15, 1930, to which reference may be had for a detailed description. It should be understood, however, that the foundation or body 10 may be constructed of any suitable fibrous similar material with other reinforcing means or without such means, but having sufficient strength and rigidity to serve as a body for a trim panel and to permit of the bending of the body without breaking or rupture, though the metal reinforced fibre board is preferred because of the inherent capability of a board of this type to be return-bent without danger of rupture of the body.

Applied to the outer face of the foundation or body 10 is a fabric finishing material 12. Said material may be of any type such as drill, broadcloth, plush, mohair or any woven or similar fabric or material. Preferably, the finishing material 12 is cemented to the foundation or body by means of a flexible waterproof cement permitting the edges of the body, after being covered with the finishing material, to be bent back upon themselves without causing separation of the finishing fabric from the foundation or body at any point.

In accordance with this invention, one or all of the edges of the body may be strengthened and rounded by turning them back against the rear face of the foundation or body with the outer or finishing material disposed externally of the bend. However, before said edges are bent back to reinforce the panel around its margins, the edges of the panel are provided with fastener receiving openings punched or cut into the material while in unfolded condition, such as indicated by the numeral 13 in Fig. 1 for example. Said openings may be, as shown in said figure, formed to permit the movement of the fastener from the extreme edge of the panel towards the line of bend of the edge without necessitating the substantial separation of the return-bent portion of the panel to permit the insertion of the fastener in the opening provided for its reception and so that the head of the fastener may be disposed between the body of the panel and said return bent portion. A suitable and preferred form of opening for the purpose just stated, is illustrated in Figs. 1, 2 and 3, and it consists of a slit 14 opening inwardly from an extreme edge of the panel leading, at its other end, to an enlarged, preferably circular opening 15.

The form of opening just described is particularly adapted for use when a fastener, such as shown in my Patent #1,679,266, patented July 31st, 1928, is used or to receive any other spring fastener having a shank or holding portion that has a greater dimension when measured in one direction than when measured in a direction at right angles thereto, because the shank can be moved through the slit with its lesser dimension extending across it, and be then turned through an angle of 90° to bring the larger dimension into a position in which it will be interlocked in the edge of the panel without liability of disassembly.

The preferred form of fastener shown in the patent just referred to, is constructed from a single piece of wire bent between its ends to form a loop constituting a head 16 of the fastener. The ends of the wire are bent toward the center of the loop 16, as indicated at 17 and 18. Said ends are then bent at right angles to the plane of the head of the fastener, and the portions thereof adjacent said head are made to diverge to form the divergent holding portions 19 and 20. The extreme ends of the wire constituting the fastener, are then bent toward each other and preferably slightly overlapped, as illustrated in Fig. 6, to form the convergent guiding portions 21 and 22. The divergent holding portions 19 and 20 and the convergent guiding portions 21 and 22 constitute the shank of the fastener, while the loop 16 and inwardly projecting portions 17 and 18 constitute the head thereof. The fastener just described is made of wire spring material.

In using the invention so far described, the panel is constructed by stamping a foundation 10 of suitable form and size, as from wire reinforced fibrous material, one face of the foundation or body 10 being covered by a suitable finished material, such as the material 12, though it should be understood that if desired, such finishing material may be omitted. At the same time that the panel is stamped from the material, the openings 13 are stamped therein producing a structure, a fragment of which is shown in Fig. 1. Or the openings may be formed after the panel is cut, if desired.

During the same operation of stamping or die-cutting, the panel and the openings for the reception of the fasteners, the panel may be scored or corrugated on the lines of bend to facilitate folding thereof, if desired, and the body may be embossed for ornamental or utilitarian purposes as may be preferred. Or the operations just referred to may be individually carried out. It should be understood that the characteristics of the panel just alluded to constitute no part of the present invention, but form the subject of a separate application filed on even date herewith Ser. No. 378,965, upon which Patent No. 1,893,104 has been issued.

The edges of the cut panel are then turned back toward the rear or unexposed face thereof as indicated in Fig. 2. The line of bend is made at such point that the openings 13 are brought to the rear of the body of the panel, when the fold has been made, so as to leave ample room for the stitching of the folded back edge of the panel to the body thereof. Said stitching is effected on the line indicated by numeral 23, and serves to hold the folded back portion of the edge of the panel relatively flatly against the rear face thereof producing a nicely rounded edge giving the effect of a thick panel with rounded edges, and thus enhancing the appearance of the finished structure. At the same time the panel is greatly strengthened. If desired, such stitching may be omitted though it is preferred. It will be observed that inasmuch as the foundation or body of the panel is constructed of wire reinforced fibrous material, that said material may be bent without danger of rupture, so that the thus selvaged and rounded edge formed by bending back a portion of the panel is not marred by any rupture of the fibrous foundation or body that might otherwise cause visible protuberances on the covered edge.

The panel is then in condition for application to the interior of the automobile body or similar structure. In order to effect the application, the fasteners are assembled with respect to the panel. When a fastener, such as shown in Figs. 6 and 7 is used, the head is simply inserted between the bent back portion of the edge of the panel and the rear face, with the minor dimension of the shank of the fastener extending across the portion 14 of the fastener receiving slit. The fastener is then moved upward toward the edge and turned to an angle of 90° bringing the major dimension of the shank of the fastener in position so that it extends across the widest portion 15 of the fastener receiving opening. In this position the fastener cannot be moved substantially with respect to the panel to which it is applied without turning the fastener through an angle of 90°, so that its minor dimension is again brought in position to extend across the narrow portion of the fastener receiving opening. If desired, the openings may be so proportioned that the enlarged portions thereof are slightly less than the major dimension of the fastener at the point where said fastener engages the opening, so that the yielding diverging portions thereof will frictionally engage the enlarged portions of the opening to firmly hold the fastener in position during the application of the panel to the supporting structure.

Such a supporting structure is indicated by the reference numeral 24 (Fig. 3). It is provided with a plurality of perforations arranged so as to align with the fastener receiving perforations formed in the margins of the trim panel. One of such perforations is indicated by the numeral 25. After the fasteners have been applied to all of the fastener receiving openings of the panel, the panel is applied to the supporting structure by bringing the protruding ends of the fasteners into registry with the openings in the supporting structure and simply pressing the panel bodily toward said structure. As the openings of the supporting structure are of substantially lesser dimension than the maximum transverse dimension of the shank of the spring fastener it will be readily understood that the edges of the perforations will be contacted by the guiding portions 21 and 22 of each of said fasteners causing the legs of the fastener to spring together until the maximum dimension of the shank of the fastener has passed through the perforation in the supporting structure. The normally diverging portions 19 and 20 then spring apart firmly gripping the sharp corners of the sides of the perforations in the supporting structure. The movement of the panel is continued until it rests firmly against the supporting structure. It will be readily understood that the fastener just described is adaptable for use with a supporting structure of any thickness, less than the length of the diverging portions 19 and 20, because it automatically adapts itself to the thickness of the structure to which it may be applied by yielding only to the extent necessary to contact with the sides of the perforations. In automobile constructions it frequently happens that the supporting structure consists of a plurality of plates in juxtaposition, whereas in other positions it includes only a single thickness of metal. The fastener just referred to adapts itself for use in either situation and serves to firmly hold the panel against the supporting structure at all points irrespective of the relative thickness of the supporting structure within the limit for which the fastener is designed.

It should be understood that the arrangement just described may be readily applied likewise to a supporting structure of wood. In this event the wooden structure is provided with sheet metal socket members of any approved form provided with openings opposite the fastener in position to receive the shank thereof. One form of a socket member, such as may be used in this situation, is illustrated in my copending application Serial No. 308,780, filed September 27, 1928.

Figs. 4, 5, 8 and 9 show a modified form of trim panel and a modified form of fastener that may be used to secure it to the supporting structure. In these figures the panel is constructed as above described, but the openings are circular and spaced slightly inwardly from the margin of the turned back edge. Such circular openings are designated by the numeral 26. The wire fastener above described could be used with such openings, if the turned-back edge is separated from the body sufficient to permit the insertion of the shank of said fastener in said openings. However, with this construction, it is preferable to utilize the spring fastener shown in Figs. 8 and 9.

Said fastener is constructed of sheet metal and shaped to provide a head 27 having a hollow protuberance or shank 28 projecting centrally therefrom. The protuberance or shank 28 is split into sections, preferably three, by slits 29 that extend somewhat into the head, as shown at 30, so that it is slightly yieldable radially. Said shank is shaped to provide a shoulder 31 arranged to engage the edges of an opening 32 in a supporting structure 33 (Fig. 5). This fastener is applied to the panel by raising the turned-back edge thereof to permit the insertion of its shank in the opening 26. It will be observed that the diameter of said opening exceeds the diameter of the shank of the fastener so that the fastener can shift slightly laterally to bring it into registry with an opening in the supporting structure, that is not exactly in registry with the shank of the fastener. This provision is necessary if a fastener, such as just described, having only a slight capability for lateral yielding is employed. The stiff wire reinforced foundation of the panel permits the use of such enlarged openings without weakening the turned-back edge so that the fastener might by any possibility, be pulled through the enlarged opening. When fasteners, such as shown in Figs. 6 and 7 having a relatively wide range of lateral flexibility are used, the fastener receiving openings need not be enlarged, as just described, but may be slightly smaller than the greatest transverse dimension of the shank of the fastener.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What I claim as my invention is:

The method of constructing a trim panel and preparing it for the reception of headed fasteners from the uncovered side thereof, which consists in applying the upholstery covering to the foundation material, cutting the panel blank from the covered foundation material and punching openings to receive the fasteners in at least one of the margins of said blank, folding said margin back against the rear face of the panel, and attaching said margin to said rear face by means applied on a line between said openings and the line of fold so as to provide an unattached portion of the folded-back margin permitting the free insertion of the fasteners while said portion is held in its folded-back position by said means.

BION C. PLACE.